(12) United States Patent
Pokharna

(10) Patent No.: US 6,845,625 B1
(45) Date of Patent: Jan. 25, 2005

(54) REVERSIBLE TWO-PHASE AND REFRIGERATION LOOP

(75) Inventor: Himanshu Pokharna, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/677,572

(22) Filed: Oct. 1, 2003

(51) Int. Cl.$^7$ .............................................. F25D 17/02
(52) U.S. Cl. ........................ 62/118; 62/259.2; 165/80.4; 361/699
(58) Field of Search ............................. 62/118, 259.2, 62/430–439; 165/97, 104.31, 80.4; 361/699, 700

(56) References Cited

U.S. PATENT DOCUMENTS

| | | | | |
|---|---|---|---|---|
| 4,302,793 A | * | 11/1981 | Rohner | 361/699 |
| 4,350,026 A | * | 9/1982 | Klein | 62/333 |
| 5,255,526 A | * | 10/1993 | Fischer | 62/59 |
| 5,263,537 A | * | 11/1993 | Plucinski et al. | 165/97 |
| 5,463,879 A | * | 11/1995 | Jones | 62/480 |
| 6,263,689 B1 | * | 7/2001 | Dodge et al. | 62/240 |
| 6,408,937 B1 | * | 6/2002 | Roy | 165/104.33 |
| 6,669,451 B1 | * | 12/2003 | Wall | 417/313 |
| 2004/0045749 A1 | * | 3/2004 | Jaura et al. | 180/65.2 |

* cited by examiner

Primary Examiner—William E. Tapolcai
(74) Attorney, Agent, or Firm—Blakely, Sokoloff, Taylor & Zafman LLP

(57) ABSTRACT

A reversible cooling loop for a notebook computer is described. Specifically, at low power levels, a two-phase fluid cooling loop is implemented to conserve the battery life. At high power levels, a refrigeration loop is implemented.

30 Claims, 3 Drawing Sheets

REVERSIBLE TWO-PHASE AND REFRIGERATION LOOP

FIELD OF THE INVENTION

The present invention pertains to the field of computer system design. More particularly, the present invention relates to a thermal management technology for notebook computers.

BACKGROUND OF THE INVENTION

A computer system typically comprises a plurality of electronic components. Such components may include a central processing unit (CPU), a chipset, and a memory. During operation, the components dissipate heat. In addition, the conversion of alternating current (AC) input power to direct current (DC) or the stepping up or down of voltage for a particular device generates heat in a computer system. If the CPU, or any other electronic component, becomes overheated, performance may suffer and the component's life may be depreciated.

A thermal management system is typically used to remove heat from a computer system. One example of a thermal management system is a refrigeration loop. A refrigeration loop typically uses a working fluid such as Freon to cool a component of a system. An evaporator picks up heat from the component. The heat causes the working fluid to change phase from a liquid to a mixture of liquid and vapor or pure vapor. A pump, working as a compressor, then transports the working fluid to a heat exchanger. The compressor compresses or increases the pressure of the gas, which results in increase in temperature of the fluid. The heat exchanger is typically coupled to a fan that rejects the heat from the working fluid to the ambient air, turning the working fluid back into a liquid. The liquid, however, is still at a high pressure. An expansion valve reduces the pressure of the working fluid and returns the working fluid to the evaporator to complete the loop.

Another example of a thermal management system is a two-phase cooling loop. Like a refrigeration loop, a two-phase cooling loop also uses a pump to circulate a working fluid to cool a component of a system. A two-phase loop typically uses a working fluid such as water. An evaporator picks up heat from the component. Within the evaporator, the heat causes the working fluid to form a vapor. The working fluid is output from the evaporator to a heat exchanger, condenser, or heat sink. The heat exchanger is typically coupled to a fan that rejects the heat from the working fluid to the ambient air. The vapor condenses in the heat exchanger, converting the working fluid back to liquid. A pump is used to drive the working fluid to the evaporator to complete the loop. The fundamental difference between the refrigeration loop and the two-phase loop is that the heat exchanger in the refrigeration loop typically has a higher temperature than the heat exchanger in the two-phase loop.

DETAILED DESCRIPTION

Figure 1:
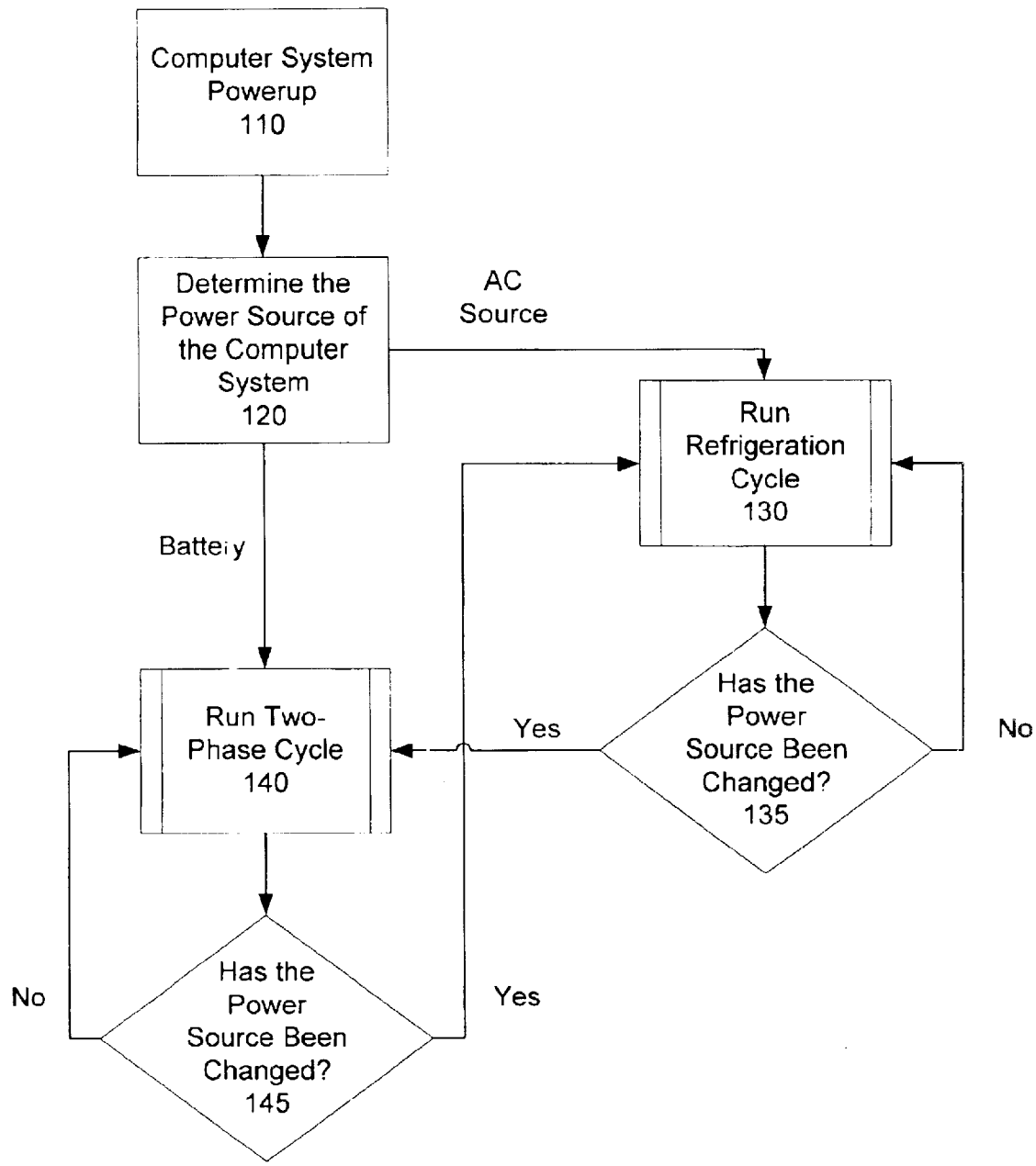
FIG. 1 is a flowchart of a reversible cooling loop.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

A refrigeration loop provides greater cooling capabilities than a two-phase loop. However, a two-phase loop consumes less power because the pump in a two-phase loop only pumps a working fluid having a liquid phase. In contrast, the pump in the refrigeration loop pumps working fluid having a liquid phase and a vapor phase, or just the vapor phase. Moreover, in order to significantly increase the temperature at the evaporator, the pump in the refrigeration loop compresses the working fluid. The reason for increasing the temperature in a refrigeration loop will be described in further detail below.

Thermal management systems are designed to extract heat from a heat source, transport the heat to a heat exchanger via a working fluid, and remove the heat in the heat exchanger. The higher the temperature of the working fluid at the heat exchanger, the easier it is for the heat exchanger to reject the heat. For one embodiment of the invention, a fan is coupled to the heat exchanger to cool the working fluid as it passes through the heat exchanger. However, in the process of extracting the heat from the heat source and transporting the heat to the heat exchanger, the working fluid often loses some of the energy. This loss of heat may be described as heat transfer resistance.

Heat transfer resistance may be defined by the formula:

$$\theta = \Delta T/P,$$

where $\theta$ is the heat transfer resistance, $\Delta T$ is the temperature difference between the source and the destination, and P is the power rejected by the thermal management system. Ideally, the temperature of the working fluid at the heat exchanger is equal to the temperature of the heat source. This, however, is difficult to achieve in practice because of physical laws like conduction and convection. In order to transport heat, a temperature difference is required. Further, heat may be lost in transport from the evaporator to the heat exchanger. Thus, even though the temperature of the heat source may be 100 degrees Celsius, the working fluid at the heat exchanger may be only 50 degrees Celsius. Since the heat exchanger uses ambient air to help cool the working fluid, the heat exchanger will not reject any heat if the temperature at the heat exchanger is less than or equal to the temperature of ambient air.

A traditional refrigeration loop helps to mitigate the effects of the heat transfer resistance through the use of a pump or compressor between the evaporator and heat exchanger. Heat transfer resistance is equal to the change in temperature divided by the power or energy rejected. Therefore, power rejection is equal to the heat transfer resistance divided by the change in temperature. It follows that power rejection may be increased by increasing the temperature of the working fluid between the evaporator and the heat exchanger. The pump helps to increase the pressure of the working fluid. According to thermodynamic properties of the working fluid, this increase in pressure results in an increase in temperature of the working fluid.

FIG. 1 is a flowchart of a reversible loop that comprises two modes of operation to take advantage of the attributes of a traditional refrigeration loop and a two-phase loop. The first operating mode may be a refrigeration cycle that is comparable in functionality to a traditional refrigeration loop. The second operating mode may be a two-phase cycle that is comparable in functionality to a traditional two-phase loop. For this embodiment of the invention, the refrigeration operation and the two-phase operation are part of the same loop and therefore share the same components and the same working fluid. The working fluid may be water, a mixture of alcohol and water, Freon, supercritical carbon dioxide, or any other refrigerant.

The refrigeration cycle, however, is operated in the reverse loop direction as the two-phase cycle. The two-phase cycle may be enabled when power conservation is desired. On the other hand, the refrigeration cycle may be enabled to maximize cooling capabilities of the computer system. The refrigeration operation and the two-phase operation of the reversible loop will be described in greater detail below in FIG. 2 and FIG. 3 respectively.

A computer system is supplied with power in operation 110. The computer system may be powered by either a battery or an AC power source. To increase the discharge cycle of the battery, the computer system may operate at a lower frequency to reduce power consumption. A hardware detection circuit may determine whether the computer system is powered by battery or AC power source in operation 120. The hardware detection circuit may comprise ordinary combinational logic. Alternatively, the computer system may use software to determine the power source of the computer system in operation 120.

For one embodiment of the invention, if the computer system is powered by an AC power source, the refrigeration cycle is run to cool the system in operation 130. Otherwise, if the computer system is powered by battery, a two-phase cycle is operated in operation 140 to conserve power.

If the detection circuit determines that the computer system has switched from battery power to AC line power in operation 145, the system may switch from a two-phase cycle to a refrigeration cycle. Similarly, if the detection circuit determines that the computer system has switched from AC line power to battery power in operation 135, the system may switch from a refrigeration cycle to a two-phase cycle. This switch is performed simply by changing the rotation of the pump. For example, the pump may change from a clockwise rotation to a counterclockwise rotation. The speed of rotation of the pump, measured in revolutions per minute, may be much greater in the refrigeration mode than the two-phase mode.

For another embodiment of the invention, the total power consumption of the computer system is determined in operation 120. The total power consumption may be determined by hardware or software. If the power consumption of the system is greater than or equal to a predefined threshold, the refrigeration cycle 130 is operated. Otherwise, if the power consumption of the system is less than the predefined power threshold, the two-phase cycle 140 is operated.

For yet another embodiment of the invention, the detection circuit monitors the temperature of the computer system or of a component of the computer system. If the temperature is greater than a predefined threshold, the refrigeration cycle 130 is operated. On the other hand, if the temperature is less than the predefined threshold, the two-phase cycle 140 is operated.

For yet another embodiment of the invention, the computer system monitors the applications of the computer system being operated in operation 120. If the computer system detects a predefined application being run, the refrigeration cycle 130 is operated. Otherwise, the two-phase cycle 140 is operated.

For yet another embodiment of the invention, the refrigeration cycle 130 is operated if the computer system is in a maximum performance mode. A computer system may be placed in a maximum performance mode by the user to fully utilize CPU capabilities.

Figure 2:
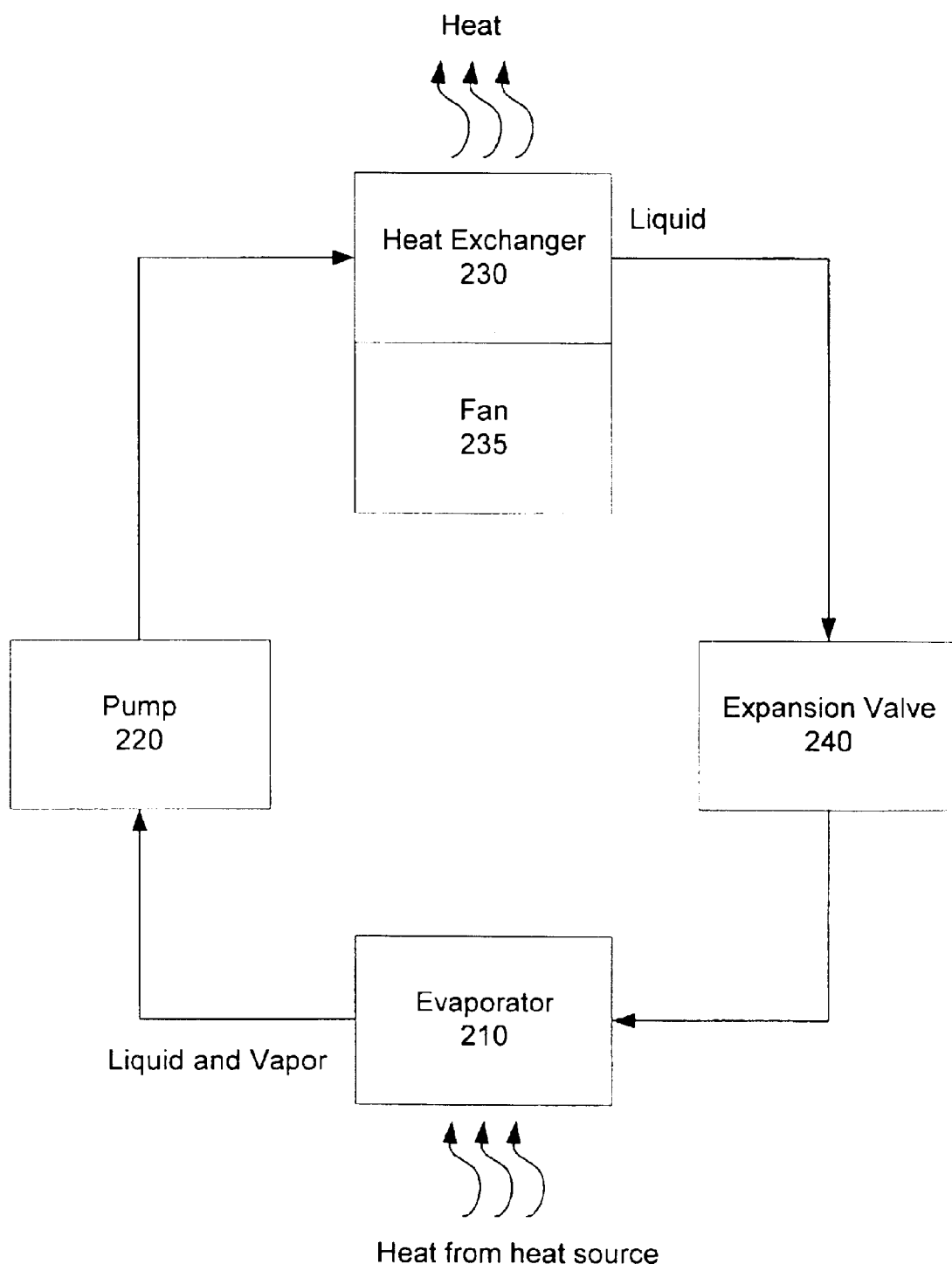
FIG. 2 is a embodiment of a reversible cooling loop in a refrigeration mode of operation.
Figure 3:
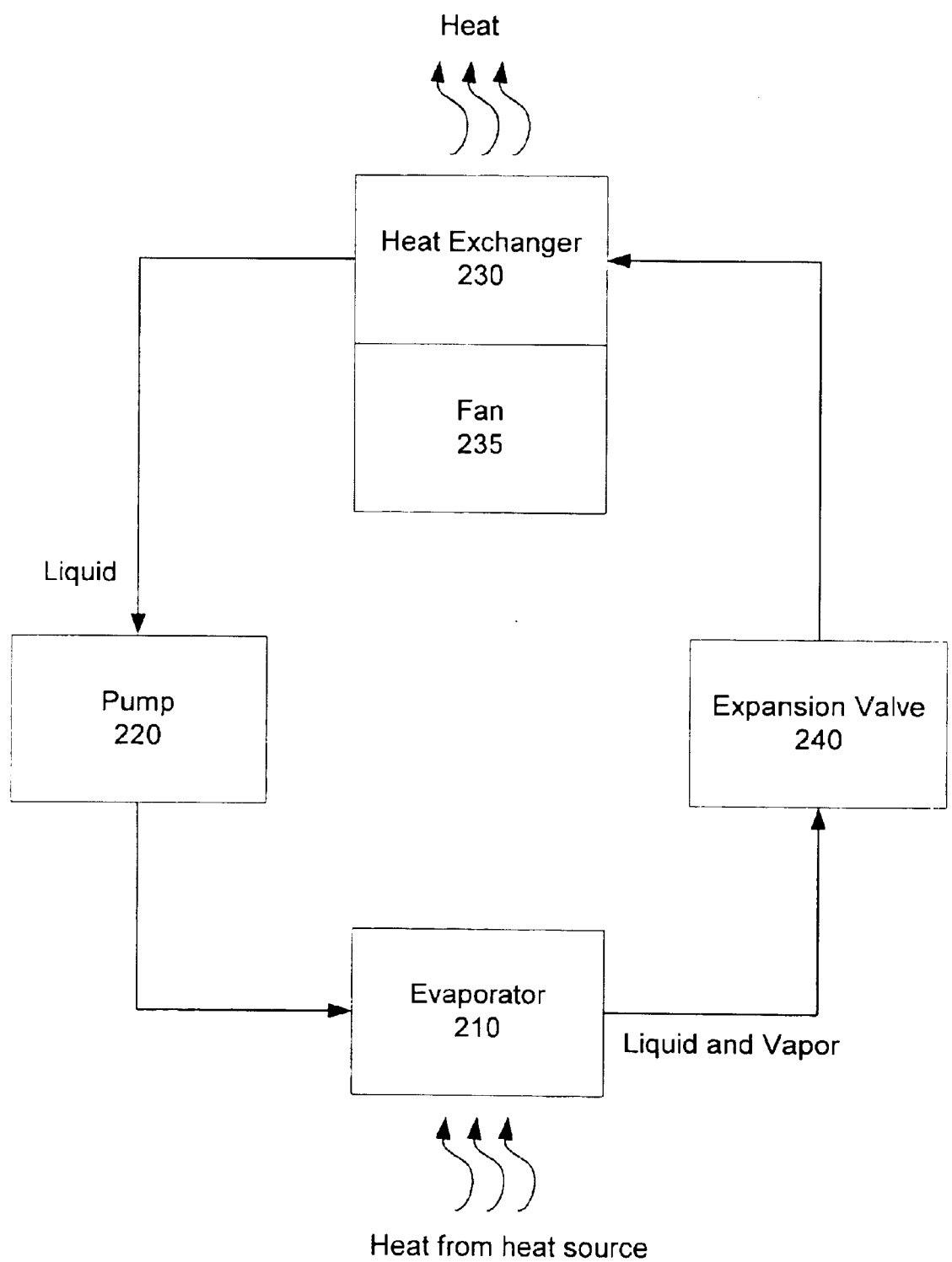
FIG. 3 is an embodiment of a reversible cooling loop in a two-phase mode of operation.

The reversible loop utilizes the same components to implement the refrigeration cycle and the two-phase cycle. The components of the refrigeration operation and the two-phase operation as depicted in FIGS. 2 and 3 comprise evaporator 210, pump 220, heat exchanger 230, fan 235, and expansion valve 240. Evaporator 210 is coupled to pump 220 and expansion valve 240. Pump 220 is coupled to heat exchanger 230. Heat exchanger 230 is coupled to fan 235 and expansion valve 240.

The reversible loop may switch between the refrigeration cycle and the two-phase cycle by changing the direction of the rotation of the pump 220. The thermal management system operates in a refrigeration cycle if the pump 220 is rotated in a first direction. The thermal management system operates in a two-phase cycle if the pump 220 is rotated in a second direction. The pump 220 may also operate at a higher revolutions per minute (RPM) when operating in the refrigeration cycle.

For the refrigeration operation of FIG. 2, evaporator 210 is thermally coupled to a heat source. As an example, the evaporator 210 may be placed on top of the heat source. The heat source may be the CPU of the computer system. The evaporator 210 picks up heat from the heat source, heating the working fluid.

The working fluid changes phase inside the evaporator 210. Prior to reaching the evaporator 210, the working fluid comprises a liquid phase. As the working fluid picks up heat at the evaporator 210, the working fluid may boil and form a vapor. Thus, after picking up heat from the heat source, the working fluid comprises a liquid phase and a vapor phase. The pump 220 is coupled to the evaporator 210 and pumps the working fluid exiting the evaporator 210 to the heat exchanger 230.

The pump 220 may be a gear pump, a vane pump, a regenerator pump, a Gerotor pump, or any other pump that allows for operation such that the direction of the rotation may be switched. The change in the rotation changes the inlet and outlet direction. The speed of the pump may be much higher in the refrigeration mode as compared to the two-phase mode. The pump 220 compresses the liquid and the gas mixture of the working fluid. This has the effect of increasing the pressure of the working fluid. As the pressure of the working fluid increases, the temperature of the working fluid also increases at saturation.

Inside the heat exchanger 230 or condenser, the heat in the working fluid is rejected via fan 235 to the ambient air and the vapor condenses. During condensation, the vapor is converted to liquid. The expansion valve 240 then reduces the pressure of the working fluid to complete the refrigeration cycle.

For one embodiment of the invention, the expansion valve 240 may be a check valve like device that allows the working fluid to flow in either direction. The expansion valve 240 reduces the pressure of the working fluid when the working fluid is flowing in a first direction by providing a large flow resistance. If the working fluid is flowing in the opposite direction, the expansion valve 240 does not affect the pressure of the working fluid.

For another embodiment of the invention, the expansion valve 240 may be an active device such as an actuator. The detection circuit provides the actuator with information regarding the thermal management system's mode of operation. If the reversible loop is in the refrigeration mode, the actuator reduces the pressure of the working fluid as it passes through.

The two-phase cycle is depicted in FIG. 3. The two-phase cycle operates in the reverse direction of the refrigeration cycle. Thus, after the evaporator 210 picks up heat from the heat source, the working fluid travels toward the expansion valve 240 instead of the pump 220. The expansion valve 240 allows the working fluid to pass through the expansion valve 240 without significant pressure drop. Thus, the expansion valve 240 only drops the pressure of the working fluid in the other direction when the reversible loop is in the refrigeration cycle.

The heat exchanger 230 then condenses the vapor in the working fluid and rejects the heat from the working fluid to the ambient air via fan 235. Finally, the pump 220 pumps the working fluid to the evaporator 210 to complete the cycle. The loop may continue indefinitely as long as the computer system is in the two-phase cycle.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method, comprising:
   determining a power consumption level of a computer system;
   cooling the computer system with a first cooling cycle if the power consumption level is greater than a predefined threshold; and
   cooling the computer system with a second cooling cycle if the power consumption level of the computer system is less than the predefined threshold, wherein the first cooling cycle and the second cooling cycle operate in reverse directions of a cooling loop.

2. The method of claim 1, wherein changing a pump rotation direction switches the computer system from the first cooling cycle to the second cooling cycle.

3. The method of claim 2, wherein the pump requires less power to operate in the second cooling cycle.

4. The method of claim 2, wherein the pump transports a working fluid.

5. The method of claim 4, wherein the pump transports a working fluid comprising a liquid phase and a vapor phase in the first cooling cycle.

6. The method of claim 4, wherein the pump transports a working fluid comprising a liquid phase in the second cooling cycle.

7. The method of claim 1, wherein the computer system is a notebook computer.

8. The method of claim 1, wherein the computer system has a power consumption level greater than the predefined threshold when powered by an alternating current (AC) source.

9. The method of claim 1, wherein the computer system has a power consumption level less than the predefined threshold when powered by a battery.

10. A method, comprising:
    cooling a computer system powered by an alternating current (AC) source with a refrigeration operation; and
    switching to a two-phase operation to cool the computer system if the AC source is changed to a battery source.

11. The method of claim 10, wherein the refrigeration operation provides greater cooling than the two-phase operation.

12. The method of claim 10, wherein the two-phase operation requires less power to operate than the refrigeration operation.

13. A thermal management system of a notebook computer system, comprising:
    a heat generating component;
    an evaporator coupled to the component to remove heat from the component, wherein the heat is transported via a working fluid; and
    a pump coupled to the evaporator to transport the working fluid from the evaporator to a heat exchanger, wherein the pump increases the temperature of the working fluid in a first operating mode, wherein the pump's direction of rotation is reversed in a second operating mode.

14. The thermal management system of claim 13, further comprising:
    a fan coupled to the heat exchanger to reject heat from the working fluid to the ambient air.

15. The thermal management system of claim 14, wherein the working fluid comprises water.

16. The thermal management system of claim 14, wherein the working fluid changes phase inside the evaporator to become a mixture of water and vapor.

17. The thermal management system of claim 15, wherein the working fluid further comprises alcohol.

18. The thermal management system of claim 16, wherein the vapor condenses in the heat exchanger.

19. The thermal management system of claim 13, further comprising:
    an expansion valve coupled to the heat exchanger to reduce the pressure of the working fluid in the first operating mode.

20. The thermal management system of claim 19, wherein the expansion valve allows the working fluid to pass from the evaporator to the heat exchanger in a second operating mode, wherein pressure of the working fluid at the evaporator is approximately equal to the working fluid at the heat exchanger.

21. The thermal management system of claim 13, wherein the pump is a gear pump.

22. The thermal management system of claim 13, wherein the pump is a vane pump.

23. The thermal management system of claim 13, wherein the pump is a regenerator pump.

24. The thermal management system of claim 13, wherein the thermal management system is set to the first operating mode if the notebook computer system is powered by an alternating current (AC) source.

25. The thermal management system of claim 13, wherein the thermal management system is set to the second operating mode if the notebook computer system is powered by a battery source.

26. The thermal management system of claim 13, wherein the thermal management system is set to the first operating mode if a component of the notebook computer system has a temperature greater than a predefined threshold.

27. The thermal management system of claim 13, wherein the thermal management system is set to the first operating mode if a predefined application is being executed on the notebook computer system.

28. The thermal management system of claim 13, wherein the component is a processor.

29. A thermal management system, comprising:
    means for cooling a notebook computer system through a cooling loop having a first operation and a second operation; and
    means for reversing the direction of a working fluid in a cooling loop to reduce power used to operate the thermal management system.

30. The thermal management system of claim 29, further comprising:
    means for determining a power source of the notebook computer system.

* * * * *